(12) United States Patent
Obrestad

(10) Patent No.: US 9,908,787 B2
(45) Date of Patent: Mar. 6, 2018

(54) METHOD FOR PRODUCING ANHYDROUS CALCIUM NITRATE POWDER

(71) Applicant: YARA INTERNATIONAL ASA, Oslo (NO)

(72) Inventor: Torstein Obrestad, Ulefoss (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 15/311,528

(22) PCT Filed: Jun. 23, 2015

(86) PCT No.: PCT/EP2015/064065
§ 371 (c)(1),
(2) Date: Nov. 16, 2016

(87) PCT Pub. No.: WO2015/197595
PCT Pub. Date: Dec. 30, 2015

(65) Prior Publication Data
US 2017/0096347 A1    Apr. 6, 2017

(30) Foreign Application Priority Data

Jun. 23, 2014   (NO) .................................. 20140795

(51) Int. Cl.
| C01F 11/44 | (2006.01) |
| F26B 3/06 | (2006.01) |
| F26B 11/02 | (2006.01) |
| F26B 11/04 | (2006.01) |

(52) U.S. Cl.
CPC ............... C01F 11/44 (2013.01); F26B 3/06 (2013.01); F26B 11/028 (2013.01); F26B 11/0445 (2013.01); C01P 2004/61 (2013.01); C01P 2006/82 (2013.01)

(58) Field of Classification Search
None
See application file for complete search history.

(56) References Cited

U.S. PATENT DOCUMENTS

| 5,902,520 A | 5/1999 | Vezzani | |
| 7,024,796 B2 * | 4/2006 | Carin | C05F 3/00 34/363 |
| 8,524,114 B2 | 9/2013 | Bewsey | |
| 2009/0189117 A1 * | 7/2009 | Bewsey | C01F 5/38 252/182.34 |

FOREIGN PATENT DOCUMENTS

| CS | 151 689 B1 | 12/1973 |
| DE | 102011005127 A1 * | 9/2012 |
| EP | 0 749 772 A1 | 12/1996 |
| FR | 654353 A | 4/1929 |
| GB | 254 939 A | 7/1926 |
| GB | 420 793 A | 12/1934 |
| GB | 602 063 A | 5/1948 |
| JP | 53-25266 A | 3/1973 |
| JP | 53-25266 * | 3/1978 |
| JP | S5850785 B2 | 11/1983 |
| NO | 22988 | 2/1913 |
| WO | 2007012951 A1 | 2/2007 |
| WO | 2015067588 A1 | 5/2015 |

OTHER PUBLICATIONS

John H. Perry, Chemical Engineers' Handbook, Fourth Edition (1963), McGraw-Hill Book Company, 20-33 through 20-35.*
PCT International Search Report and Written Opinion dated Aug. 24, 2015 for PCT International Patent Application No. PCT/EP2015/064065, 10 pages.
PCT Notification Concerning Transmittal of International Preliminary Report on Patentability and Written Opinion of the International Searching Authority, dated Sep. 14, 2016 in connection with PCT International Patent Application No. PCT/EP2015/064065, 13 pages.
Standard Turbo Dryer, Jan. 1, 2012, XP055207518, retrieved from the internet: URL:http://wyssmont.com/lib/images/pdf/9450331548_Dryers main 1.pdf, retrieved on Aug. 13, 2015, 1 page.
Norwegian Search Report in connection with priority application No. 20140795, dated Jan. 6, 2015 (3 pages).
www.vomm.it, Chemical & Pharmaceutical, Sections: Drying and Granulation & Concentration, [Hentet fra internett/Wayback Machine Dec. 18, 2014](https://webarchive.org/web/20130215073540/http://www.vomm.it/c_f_technologia_eng.html), 2 pages.
www.vomm.it, Turbo Technology [Hentet fra internett Dec. 18, 2014 (Wayback Machine)] (https://web.archive.org/web/20120520103234/http://www.vomm.it/gruppo_turbo_eng.html), 2 pages.
Sammensdrag fra STN: Powdered Calcium Nitrate, Entered STN: May 12, 1984, 1 page.

* cited by examiner

Primary Examiner — Wayne Langel
(74) Attorney, Agent, or Firm — Amster, Rothstein & Ebenstein LLP

(57) ABSTRACT

The invention relates to a method for producing an anhydrous powder having a calcium nitrate content of between 92 and 99.9 weight %, a water content of between 0.1 and 8 weight %; and a particle size of between 0.05 and 1.5 mm, wherein the method comprises the step of subjecting a calcium nitrate solution having a water content of between 70 and 15 weight % and a calcium nitrate content of between 30 and 85 weight % to a drying step in an industrial turbo-dryer, resulting in the anhydrous calcium nitrate powder. The invention furthermore relates to such an anhydrous calcium nitrate powder and the use of an industrial turbo-dryer to produce such anhydrous calcium nitrate powder.

8 Claims, No Drawings

METHOD FOR PRODUCING ANHYDROUS CALCIUM NITRATE POWDER

FIELD OF THE INVENTION

The invention relates to a method for producing anhydrous calcium nitrate powder. Calcium nitrate is abbreviated as CN and has a structure formula of $Ca(NO_3)_2$.

The invention furthermore relates to an anhydrous calcium nitrate powder, more specifically produced by the abovementioned method.

The invention also relates to the use of an industrial turbo-dryer to produce such anhydrous calcium nitrate powder.

BACKGROUND OF THE INVENTION

Calcium nitrate has become a large and important product in the fertilizer field and also for many other technical applications such as waste water treatment, the concrete industry, etc.

Solid crystalline calcium nitrate is commonly found as hydrates such as $Ca(NO_3)_2.4H_2O$, $Ca(NO_3)_2.3H_2O$ and $Ca(NO_3)_2.2H_2O$. $Ca(NO_3)_2.4H_2O$ is a very common salt with a melting point of 42° C. It contains 68-69 weight % of calcium nitrate and about 30 weight % of water.

The traditional method for making calcium nitrate tetra hydrate [$Ca(NO_3)_2.4H_2O$] is by means of crystallization of a solution high in calcium nitrate which is cooled down below the saturation point of the calcium nitrate tetra hydrate. The solution is then filtered through which wet calcium nitrate tetra hydrate crystals are deposited on a filter. The crystals are removed from the filter and dried under vacuum at a temperature below 40° C.

Prilled or granulated calcium nitrate is commercially available. The normal composition of this material is between 77 and 80 weight % of $Ca(NO_3)_2$, between 6 and 8 weight % of ammonium nitrate (AN) and between 14 and 17 weight % of crystallization water. Therein, the salt AN*5CN*10H$_2$O, abbreviated as 1:5:10, constitutes a major part.

Prilled or granulated calcium nitrate products are produced by forming particles (e.g. prills, granules) of a melt of calcium nitrate, ammonium nitrate and water. Typically, such a melt has a water content of between 15 and 18 weight % of water and between 5 and 8 weight % of ammonium nitrate in addition to the calcium nitrate. The ammonium nitrate and the water are necessary to form a melt around 100° C. and 110° C. The ammonium nitrate content is necessary to make the melt solidify quickly. If the ammonium nitrate is removed, the solidification process proceeds so slowly that normal prilling or granulation methods cannot be applied.

In WO 2004/039722, a method is described for the production of nitrate containing products from undercooling melts. More specifically, a cooling belt is used for solidification of the particles. This method is amongst others used to produce calcium nitrate in the form of prills, granules or pastilles. This procedure is not applicable to make pure calcium nitrate without crystal water since the melting point of pure anhydrous calcium nitrate is more than 500° C.

For some applications however, there exists the need for pure, anhydrous calcium nitrate, i.e. calcium nitrate which is free of ammonium nitrate or any other salts and free of crystal water.

In GB 392,531, a process is disclosed for the preparation of non-caking fertilizers containing calcium nitrate, in which calcium nitrate solutions are evaporated to a sandy-pasty consistency in which they contain about 90-95% of calcium nitrate (calculated as anhydrous calcium nitrate), and then converting the concentrated product without any substantial further concentration into granular form by mechanical disaggregation in bulk at a temperature substantially above atmospheric of the order of 50 to 100° C. In example 1, an amount of calcium nitrate tetra hydrate is melted in a kneading machine adapted to be heated, where after this melt is further evaporated under vacuum to a content of calcium nitrate of 94%, while the temperature is raised to 90° C. The melt, at first thinly liquid, becomes rapidly thickened and immediately afterwards changes over to a sandy-pasty mass. This mass is then cooled to 80° C. and can easily be brought into a granular form by mechanical disaggregation at 80° C.

The disadvantage of the method as described in GB 392,531 however is that it gives rise to salt deposits on equipment and a flaked, dusty product. Therefore, this method is not well suited for large-scale production of calcium nitrate.

CS 151689 B1 relates to production of powdered calcium nitrate solutions dried with hot air, the solution having a concentration of 15 to 70 weight % calcium nitrate dried in a stream of hot air with an inlet temperature of 130-500° C. and an outlet temperature of at least 80° C.

WO 2007/012951 A1 relates to a method of producing anhydrous calcium nitrate, anhydrous magnesium nitrate or a mixture thereof, which includes providing a solution of calcium nitrate, magnesium nitrate or a mixture thereof, and removing water therefrom in a batch working pulse combustion drier.

A disadvantage of the methods from CS 151689 B1 and WO 2007/012951 A1 is that the calcium nitrate powder produced can be too wet/big or too dry/dusty.

The aim of the present invention is to form an anhydrous calcium nitrate having high to very high CN concentrations (also denominated as "pure" anhydrous calcium nitrate), that can be mixed with other powdery systems, therewith avoiding segregation. A further aim of the present invention is to form an anhydrous calcium nitrate powder with a determined target particle size between 0.05 and 1.5 mm, preferred water content between 0.1 and 8 weight % and calcium nitrate content between 92 and 99.9 weight %. A further aim of the present invention is to form a calcium nitrate powder wherein the moister content is within a value suitable for handling. A further aim of the present invention is provide a method for producing calcium nitrate powder wherein clogging of particles during the process is avoided. A further aim of the present invention is to provide such a highly concentrated anhydrous calcium nitrate that can dissolve quickly.

SUMMARY OF THE INVENTION

According to a first aspect of the present invention, a method is provided for producing an anhydrous calcium nitrate powder wherein the method comprises the step of subjecting a calcium nitrate solution having a water content of between 70 and 15 weight % of water and a calcium nitrate content of between 30 and 80 weight % to a drying step,
wherein the calcium nitrate solution is subjected to a drying step in an industrial turbo-dryer, resulting in the anhydrous calcium nitrate powder having
    a calcium nitrate content of between 92 and 99.9 weight %;

a water content of between 0.1 and 8 weight %; and a particle size of between 0.05 and 1.5 mm.

An industrial turbo-dryer is usually used to reduce the moisture content of various types of forestry wastes such as bagasse, coir, jute, pith and others. For instance a turbo-dryer (also called turbo-concentrator) as described in European patent 0749772 and manufactured by the company VOMM Impianti e Processi, Rozzano (MI) can be used. This machine basically comprises a cylindrical tubular body (also called a drum), having a horizontal axis and closed at opposite ends. These ends are provided with openings for the introduction of a liquid mixture to be treated and a stream of dry air travelling in the same direction. Furthermore, a heating jacket for heating the internal wall of the tubular body to a predetermined temperature, and a bladed rotor rotatable supported in the cylindrical tubular body. The circumferential speed of the bladed rotor varies between 30 and 50 m/s.

In an advantageous method according to the invention, the drying step is performed at a temperature of between 200 and 300° C., more preferably between 240 and 280° C.

In order to avoid the risk of crystallization and not to spend too much energy to evaporate the water, in a favorable method according to the invention, the calcium nitrate solution has a water content of between 45 and 50 weight % and a calcium nitrate content of between 55 and 50 weight %.

In a preferred method according to the invention, the anhydrous calcium nitrate powder has a calcium nitrate content of between 96 and 99.9 weight % and a water content of between 0.1 and 4 weight %, and most preferably a calcium nitrate content of between 95 and 99.9 weight % and a water content of between 0.1 and 5 weight %.

In a preferred method according to the invention, the anhydrous calcium nitrate powder has a particle size between 0.1 and 1 mm, and most preferably between 0.08 and 1 mm.

In order to obtain an anhydrous, "pure" calcium nitrate powder, in a preferred method according to the invention, the calcium nitrate solution is purified before being subjected to the drying step, for instance by filtration.

According to a further aspect of the invention, anhydrous calcium nitrate powder is provided having a calcium nitrate content of between 92 weight % and 99.9 weight %;

a water content of between 0.1 weight % and 8 weight %;

and it has a particle size of between 0.05 and 1.5 mm, wherein the calcium nitrate content and water content add up to 100 weight %.

More specifically, the anhydrous calcium nitrate according to the invention is produced by a method according to the invention as described above.

According to a final aspect of the present invention, the use of an industrial turbo-dryer to produce anhydrous calcium nitrate powder having a calcium nitrate content of between 92 weight % and 99.9 weight %;

a water content of between 0.1 weight % and 8 weight %; and a particle size of between 0.05 and 1.5 mm;

starting from a calcium nitrate solution having a water content of between 70 and 15 weight % and a calcium nitrate content of between 30 and 85 weight % is provided.

More preferably, this use implements the method using an industrial turbo-drier according to the invention as described above.

DETAILED DESCRIPTION OF THE INVENTION

The present invention relates to a method to produce anhydrous calcium nitrate powder by subjecting a calcium nitrate solution to a drying step which is performed in an industrial turbo-dryer which is a continuous operating process. In order to obtain a pure end product, the calcium nitrate solution preferably is purified by filtering it.

The industrial turbo-dryer consists of a horizontal drum with heating walls. Preferably, oil is used as the heating medium. In the longitudinal direction of the drum, a rotating shaft with blades has been mounted. The blades are extending only 5 mm from the wall of the drum. During operation, the shaft rotates with a high speed and creates a strong turbulence. By varying the angle of the blades, the retention time of the material in the drum can be varied. The liquid calcium nitrate solution is fed into the drum by warm air, and anhydrous calcium nitrate powder is extracted from the air stream leaving the drum by using a cyclone.

The temperature applied in the industrial dryer is preferably between 200 and 300° C., and more preferably between 240 and 280° C.

The starting calcium nitrate solution has a water content of between 15 and 70 weight % and a calcium nitrate content of between 30 and 85 weight %, and more preferably a water content of between 45 and 50 weight % and a calcium nitrate content of between 55 and 50 weight %, and most preferably approximately 50 weight % and a calcium nitrate content of approximately 50 weight %.

Subjecting this calcium nitrate solution to a turbo-dryer as disclosed above, allows an almost complete removal of the calcium nitrate dissolved in the calcium nitrate solution, resulting in an anhydrous calcium nitrate powder having a calcium nitrate content of between 92 and 99.9 weight %;

a water content of between 0.1 and 8 weight %; and a particle size of between 0.05 and 1.5 mm.

The obtained anhydrous calcium nitrate powder more preferably has a calcium nitrate content of between 96 and 99.9 weight % and a water content of between 0.1 and 4 weight %, and most preferably a calcium nitrate content of between 95 and 99.9 weight % and a water content of between 0.1 and 5 weight %.

In order to measure the particle size, the sample can be segregated by particle size. In particle segregation, particulate solids tend to segregate by virtue of differences in the size, and also physical properties such as volume, density, shape and other properties of particles of which they are composed. In the present example the particles obtained were segregated in a sieve shaker using a stack of woven wire mesh sieves having mesh sizes of 2 mm, 1.5 mm, 1 mm, 0.5 mm, 0.1 mm and 0.05 mm, respectively. Additional sieves can be used to obtain additional segregation.

The anhydrous calcium nitrate powder more preferably has a particle size between 0.1 and 1 mm, and most preferably between 0.08 and 1 mm.

EXAMPLE 2000 liters of a purified calcium nitrate solution having a water content and a calcium nitrate content of 50 weight %, for example a purified Nutriox® solution, commercialised by Yara, having a density of 1.482 kg at 22° C. and a pH of 6.0, was pumped into a pilot turbo-dryer commercialised by the Italian firm VOMM. The feeding rate of the drum of this turbo-dryer was between 70 and 80 liter per hour. By applying a temperature of approximately 270° in the VOMM turbo-dryer, an anhydrous calcium nitrate powder was obtained at a rate of 35 to 40 kg per hour. The obtained anhydrous calcium nitrate powder was collected and analysed. Results of this analysis can be found in Table 1 below.

TABLE 1

Results of analysis of calcium nitrate produced by VOMM turbo-dryer

| Feeding rate of drum of VOMM turbo-dryer (litre/hour) | Wall temperature of the drum of VOMM turbo-dryer (° C.) | Composition of obtained product | pH 10% solution | Appearance obtained product | Particle size (mm) |
|---|---|---|---|---|---|
| 70 | 270 | 1.7 weight % $H_2O$ 98.2 weight % $Ca(NO_3)_2$ | 9.0 | Dry white powder | 0.5-1.5 |
| 80 | 270 | 2.5 weight % $H_2O$ 97.4 weight % $Ca(NO_3)_2$ | 9.1 | Dry white powder | 0.5-1.5 |

The obtained anhydrous calcium nitrate powder has a calcium content of 23.5-24 weight % of calcium and around 16.5 weight % of nitrogen.

X-ray diffraction of the obtained calcium nitrate powder shows that the powder mainly consists of pure dry $Ca(NO_3)_2$ with traces of $Ca(NO_3)_2.2H_2O$ and $Ca(NO_3)_2.3H_2O$. No CaO and $Ca(OH)_2$ were detected. It is however likely that some ppm of these latter components were formed, being responsible for the pH increase.

The obtained anhydrous calcium nitrate powder dissolves quickly in water and forms a clear solution up to 10-15 weight % calcium nitrate. On further increasing the calcium nitrate in the solution, the calcium nitrate solution becomes weakly turbid, this probably due to the presence of some ppm CaO and $Ca(OH)_2$.

In order to store the anhydrous calcium nitrate powder according to the invention for a longer period of at least a year, this anhydrous calcium nitrate powder must be stored in well-sealed, vapour tight bags. The anhydrous calcium nitrate powder according to the invention can also be compacted into granules by using various compaction machines.

The invention claimed is:

1. A method for producing an anhydrous powder, wherein the method comprises the step of subjecting a calcium nitrate solution having a water content of between 70 and 15 weight % of water and a calcium nitrate content of between 30 and 85 weight % to a drying step, CHARACTERISED IN THAT the calcium nitrate solution is subjected to a drying step performed at a temperature of between 200 and 300° C. in a turbo-dryer, wherein the turbo-dryer comprises a drum having a horizontal axis and being closed at opposite ends that are provided with openings for the introduction of the solution and a stream of dry air travelling in the same direction, and further comprises a heating jacket for heating the internal wall of the tubular body to a predetermined temperature, and a bladed rotor rotatable supported in the drum, and wherein the drying step produces the anhydrous calcium nitrate powder having a calcium nitrate content of between 92 and 99.9 weight %;

a water content of between 0.1 and 8 weight %; and a particle size of between 0.05 and 1.5 mm;

wherein the anhydrous calcium nitrate produced in the drying step has a calcium nitrate content and a water content adding up to 100 weight %.

2. The method according to claim 1, characterized in that the drying step is performed at a temperature of between 240 and 280° C.

3. The method according to claim 1, characterized in that the calcium nitrate solution has a water content of between 45 and 50 weight % and a calcium nitrate content of between 55 and 50 weight %.

4. The method according to claim 1, wherein the drying step produces anhydrous calcium nitrate powder having a content of calcium nitrate between 95 and 99.9 weight % and a water content of between 0.1 and 5 weight %.

5. The method according to claim 4, wherein the produced anhydrous calcium nitrate powder has a content of calcium nitrate between 96 and 99.9 weight % and a water content of between 0.1 and 4 weight %.

6. The method according to claim 1, wherein the drying step produces anhydrous calcium nitrate powder having a particle size between 0.1 and 1 mm.

7. The method according to claim 1, wherein the drying step produces anhydrous calcium nitrate powder having a particle size of between 0.08 and 1 mm.

8. The method according to claim 1, wherein the calcium nitrate solution is purified before being subjected to the drying step.

* * * * *